United States Patent
Danko (10) Patent No.: US 11,312,435 B2
(45) Date of Patent: Apr. 26, 2022

(54) MOTORIZED APPARATUS INCLUDING ARTICULATED BODY

(71) Applicant: General Electric Company, Schenectady, NY (US)

(72) Inventor: Todd William Danko, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 952 days.

(21) Appl. No.: 16/038,959

(22) Filed: Jul. 18, 2018

(65) Prior Publication Data
US 2020/0023915 A1 Jan. 23, 2020

(51) Int. Cl.
*B62D 57/024* (2006.01)
*B60B 19/00* (2006.01)
*B62D 61/10* (2006.01)

(52) U.S. Cl.
CPC .......... *B62D 57/024* (2013.01); *B60B 19/006* (2013.01); *B60B 19/003* (2013.01); *B62D 61/10* (2013.01); *G05D 2201/0207* (2013.01)

(58) Field of Classification Search
CPC ............................ B62D 57/024; B60B 19/006
See application file for complete search history.

(56) References Cited

U.S. PATENT DOCUMENTS

| | | | |
|---|---|---|---|
| 3,435,908 A | 4/1969 | Sunderlin et al. | |
| 5,220,869 A * | 6/1993 | Pelrine ................. | B62D 57/024 104/138.2 |
| 5,284,096 A | 2/1994 | Pelrine et al. | |
| 5,388,528 A | 2/1995 | Pelrine et al. | |
| 7,011,171 B1 | 3/2006 | Poulter | |
| 7,137,465 B1 | 11/2006 | Kerrebrock et al. | |

(Continued)

FOREIGN PATENT DOCUMENTS

| | | |
|---|---|---|
| CA | 106514609 A | 3/2017 |
| CN | 101423074 A | 5/2009 |

(Continued)

OTHER PUBLICATIONS

International Search Report and Written Opinion, PCT/US2019/041424, dated Oct. 7, 2019, 15 pages.

(Continued)

*Primary Examiner* — Jacob D Knutson
*Assistant Examiner* — Conan D Duda
(74) *Attorney, Agent, or Firm* — Fletcher Yoder, P.C.

(57) ABSTRACT

A motorized apparatus includes an articulated body assembly, a plurality of wheels coupled to the articulated body assembly, and at least one maintenance device coupled to the articulated body assembly. The articulated body assembly includes a first body and a second body. The articulated body assembly includes a joint coupling the first body to the second body. The first body is pivotable relative to the second body about a pivot axis extending through the joint. At least one wheel is transitionable between a first position and a second position. The motorized apparatus also includes a motor drivingly coupled to the plurality of wheels and configured to move the articulated body assembly relative to a surface. The motorized apparatus further includes at least one magnet coupled to the at least one wheel.

20 Claims, 9 Drawing Sheets

(56) References Cited

U.S. PATENT DOCUMENTS

| | | | |
|---|---|---|---|
| 8,360,177 B2* | 1/2013 | Fischer | F16L 55/32 |
| | | | 180/7.1 |
| 9,586,636 B1* | 3/2017 | Burmeister | B62D 49/0621 |
| 9,863,919 B2 | 1/2018 | Zanini et al. | |
| 2006/0162610 A1* | 7/2006 | Reboredo Losada | B60B 3/048 |
| | | | 104/138.1 |
| 2008/0308326 A1* | 12/2008 | Moser | B62D 57/028 |
| | | | 180/21 |
| 2010/0212983 A1 | 8/2010 | Lama et al. | |
| 2011/0050374 A1* | 3/2011 | Dvorak | B60B 19/006 |
| | | | 335/219 |
| 2011/0174565 A1* | 7/2011 | Rochat | B62D 57/024 |
| | | | 180/167 |
| 2012/0072053 A1 | 3/2012 | Zesch et al. | |
| 2013/0140801 A1 | 6/2013 | Schlee et al. | |
| 2014/0230711 A1* | 8/2014 | Lovelace | B08B 17/00 |
| | | | 114/222 |
| 2014/0260705 A1 | 9/2014 | Kimpel et al. | |
| 2015/0151572 A1* | 6/2015 | Parrott | B60B 19/006 |
| | | | 301/5.23 |
| 2015/0151797 A1* | 6/2015 | Outa | B60B 19/12 |
| | | | 180/20 |
| 2015/0153312 A1 | 6/2015 | Gonzalez et al. | |
| 2016/0114843 A1 | 4/2016 | Schlee et al. | |
| 2016/0268823 A1 | 9/2016 | Gonzalez et al. | |
| 2017/0334241 A1* | 11/2017 | Gonzalez | B60B 19/003 |
| 2017/0355225 A1* | 12/2017 | Lee | B08B 7/00 |
| 2018/0154910 A1* | 6/2018 | Li | B60B 17/00 |
| 2018/0281552 A1* | 10/2018 | Lee | B60B 19/00 |
| 2018/0370279 A1* | 12/2018 | Reboredo Losada | B61C 15/04 |
| 2019/0152544 A1* | 5/2019 | Outa | B05C 11/10 |

FOREIGN PATENT DOCUMENTS

| | | |
|---|---|---|
| EP | 0526900 A1 | 2/1993 |
| WO | 2015081135 A1 | 6/2015 |

OTHER PUBLICATIONS

Tache et al., "Magnebike: A Magnetic Wheeled Robot with High Mobility for Inspecting Complex-Shaped Structures", Journal of Field Robotics, vol. 26, Issue 5, pp. 453-476, May 2009.

San-Millan et al., "Design of a Teleoperated Wall Climbing Robot for Oil Tank Inspection", Mediterranean Conference on Control and Automation (MED), Jun. 16-19, 2015.

Huang et al., "Design and Performance Analysis of a Tracked Wall-Climbing Robot for Ship Inspection in Shipbuilding", Ocean Engineering, vol. 131, pp. 224-230, Feb. 1, 2017.

Tache, Fabien, "Robot Locomotion and Localization on 3D Complex-Shaped Structures", ETH Zurich Research Collection, 163 pps, Mar. 2010.

International Preliminary Report on Patentability; PCT/US2019/041424, dated Jan. 28, 2021; 9 pages.

* cited by examiner

MOTORIZED APPARATUS INCLUDING ARTICULATED BODY

BACKGROUND

The field of the disclosure relates generally to motorized apparatus and, more particularly, to motorized apparatus that include an articulated body.

At least some known machines include components that require periodic maintenance in difficult-to-access locations. For example, storage vessels define a cavity and are configured to contain materials such as petroleum within the cavity. The storage vessels also include an outer surface. In addition, at least some known machines, such as turbines for aircraft engines and gas and steam powered turbines for power generation and industrial applications, include an outer case defining a cavity. Components within the cavity and along an outer surface of the outer case may be difficult to access. During operation, components of the machines experience degradation. Accordingly, periodic maintenance of the machines is required. However, at least some periodic maintenance requires that the machines be removed from service during the maintenance. In addition, some periodic maintenance presents risk for personnel required to perform the maintenance. For example, sometimes personnel physically access the cavity of storage vessels containing potentially hazardous materials to perform maintenance of the storage vessels. Accordingly, the stored materials are drained from the storage vessels and the cavities are ventilated to reduce exposure of the personnel to the materials during maintenance. In addition, safety equipment such as scaffolding is required to access locations of at least some known storage vessels.

Robotic systems are sometimes used during maintenance operations to access portions of the machine. However, at least some robotic systems include complicated apparatus and require extensive setup. In addition, at least some known robotic system are not able to access all locations and the robotic system must be repositioned during the maintenance operation. Sometimes, the robotic systems include a motorized apparatus that is configured to travel along a surface of the machine. However, at least some known motorized apparatus have difficulty traversing structures along the surface and/or require complicated mechanisms to traverse or avoid the structures. As a result, at least some known robotic system increase the cost and time required for maintenance of the machines.

BRIEF DESCRIPTION

In one aspect, a motorized apparatus is provided. The motorized apparatus includes an articulated body assembly, a plurality of wheels coupled to the articulated body assembly, and at least one maintenance device coupled to the articulated body assembly. The articulated body assembly includes a first body and a second body. The articulated body assembly includes a joint coupling the first body to the second body. The first body is pivotable relative to the second body about a pivot axis extending through the joint. At least one wheel of the plurality of wheels is transitionable between a first position and a second position. The motorized apparatus also includes a motor drivingly coupled to the plurality of wheels and configured to move the articulated body assembly relative to a surface. The motorized apparatus further includes at least one magnet coupled to the at least one wheel of the plurality of wheels.

In another aspect, a system for maintaining a machine is provided. The system includes a motorized apparatus configured to move along a path. The motorized apparatus includes an articulated body assembly including at least one joint. The at least one joint is configured to allow articulation of the articulated body assembly about at least one axis. The motorized apparatus also includes a plurality of wheels coupled to the articulated body assembly. At least one wheel of the plurality of wheels is transitionable between a first position and a second position. The motorized apparatus further includes a drive system configured to move the articulated body relative to a surface. The drive system includes a motor and a steering component. The steering component is configured to steer the motorized apparatus along the path. The motorized apparatus also includes at least one magnet coupled to the plurality of wheels. The system also includes at least one sensor coupled to the motorized apparatus. The at least one sensor is configured to detect structures along the path of the motorized apparatus. The system further includes a controller configured to transmit information to the drive system to adjust an angle of approach of the motorized apparatus based on information detected by the at least one sensor.

In yet another aspect, a method for operating a motorized apparatus is provided. The method includes positioning the motorized apparatus on a surface of a machine. The motorized apparatus includes an articulated body assembly and a plurality of wheels coupled to the articulated body assembly. The articulated body assembly including at least one joint configured to allow articulation of the articulated body assembly about an axis. The method also includes rotating the plurality of wheels to drive the motorized apparatus along the surface of the machine. Each wheel of the plurality of wheels is transitionable between a first position and a second position. The method further includes detecting, using at least one sensor, a structure along the surface. The method also includes steering the motorized apparatus to achieve an angle of approach of the motorized apparatus relative to the structure, transitioning at least one wheel of the plurality of wheels between the first position and the second position as the motorized apparatus traverses the structure, and moving at least one magnet on the at least one wheel relative to the surface when the at least one wheel is moved between the first position and the second position.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the exemplary embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Embodiments described herein provide motorized apparatus for use in maintaining machines. The motorized apparatus is configured to move along a surface and/or through a cavity of a machine. The motorized apparatus is self-propelled and includes an articulated body assembly. For example, the motorized apparatus includes a first body, a second body, and a joint extending through a seam between the first body and the second body. The joint allows the first body to pivot relative to the second body about a pivot axis through the joint. As a result, the motorized apparatus provides increased access to difficult-to-reach locations and reduces the amount of time the machine is out of service for maintenance.

Figure 1:
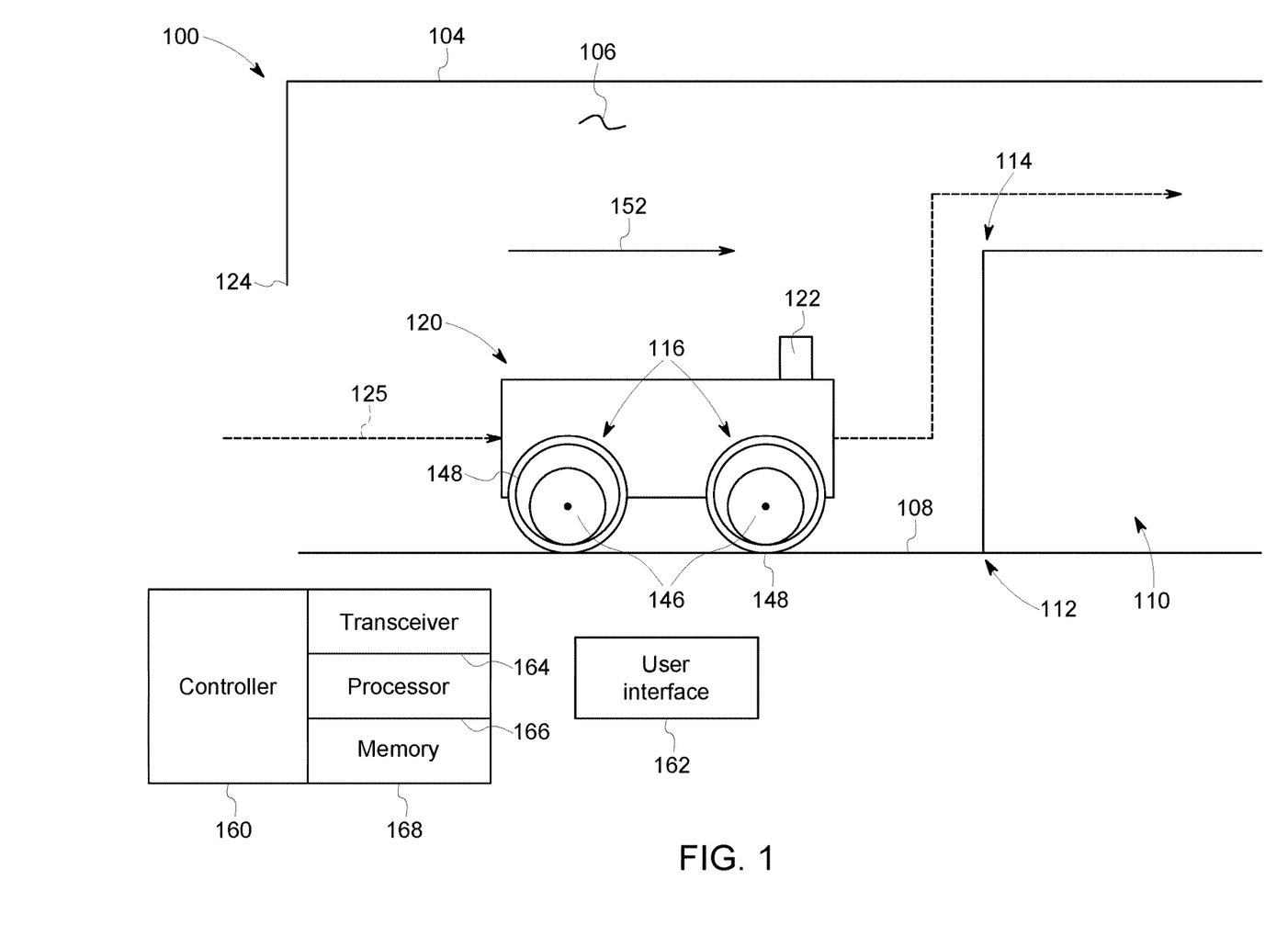
FIG. 1 is a schematic view of an exemplary motorized apparatus traveling along a path within a cavity of an exemplary machine.
Figure 2:
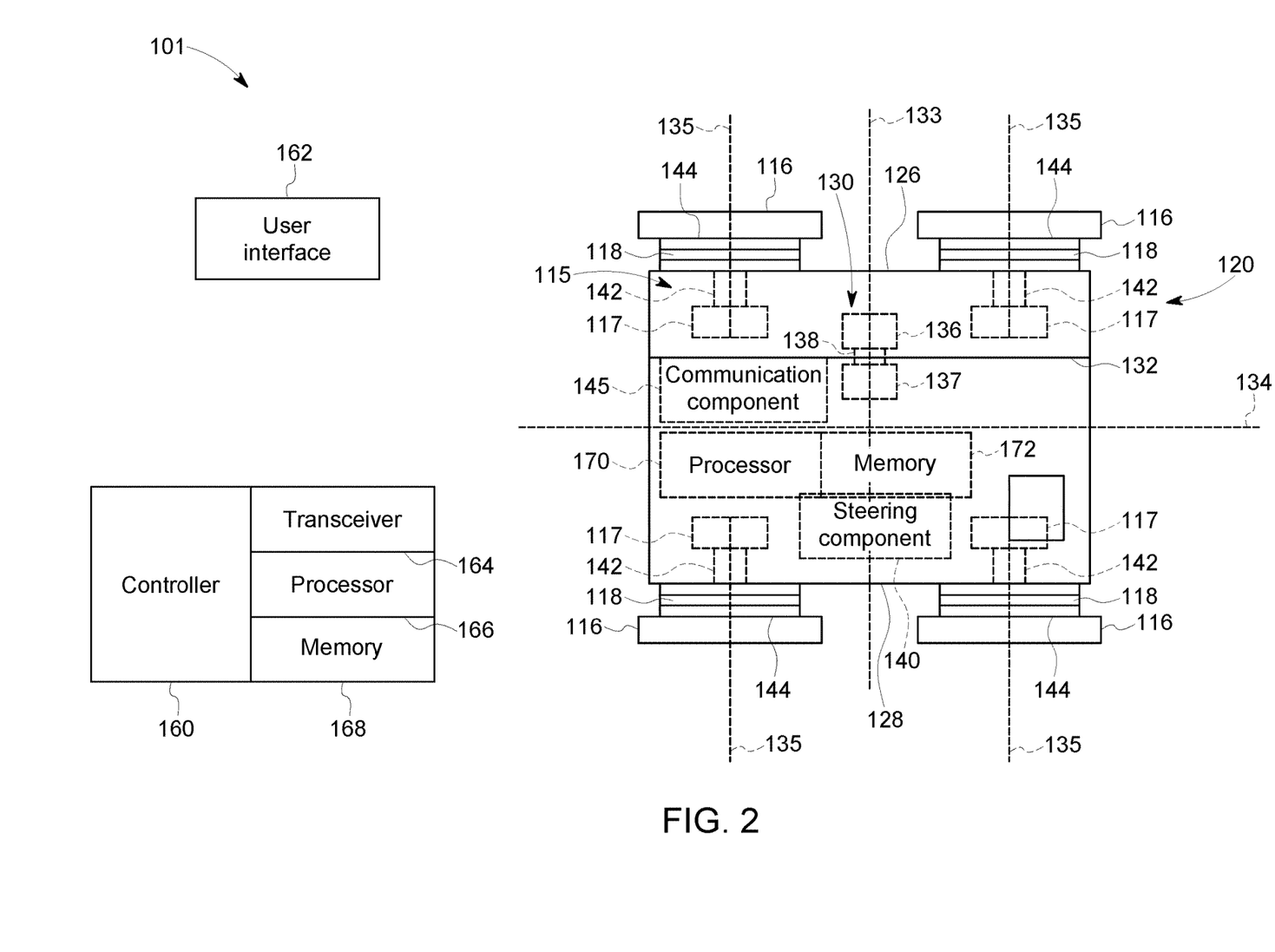
FIG. 2 is a schematic view of the motorized apparatus shown in FIG. 1.

FIG. 1 is a schematic view of an exemplary motorized apparatus 102 traveling along a path 125 within a cavity 106 of an exemplary machine. FIG. 2 is a schematic view of a system 101 including a motorized apparatus 102. In the exemplary embodiment, the machine is a storage vessel 100 and includes a case 104 defining cavity 106. Storage vessel 100 is configured to contain materials within cavity 106. In alternative embodiments, the machine is any machine and includes any assembly. For example, in some embodiments, the machine includes, without limitation, any of the following: a compressor, a blower, a pump, a turbine, a motor, and a generator.

In addition, in the exemplary embodiment, motorized apparatus 102 is configured to travel along a surface and/or through cavity 106 of storage vessel 100. Accordingly, motorized apparatus 102 facilitates maintenance of storage vessel 100. For example, motorized apparatus 102 facilitates inspection and repair of storage vessel 100 at locations that are difficult to access from an exterior of storage vessel 100, such as cavity 106 of storage vessel 100. Moreover, motorized apparatus 102 is self-propelled, meaning that motorized apparatus 102 moves within cavity 106 without an external force acting on motorized apparatus 102.

During operation, motorized apparatus 102 enters cavity 106 of storage vessel 100 through any suitable access port or opening 124 of storage vessel 100. For example, in some embodiments, motorized apparatus 102 travels along path 125 through opening 124 and into cavity 106. In alternative embodiments, motorized apparatus 102 moves along any path that enables motorized apparatus 102 to operate as described herein.

Also, during operation, motorized apparatus 102 is used to inspect and/or repair any interior components of storage vessel 100. For example, motorized apparatus 102 is moved along path 125 within cavity 106 of storage vessel 100. In some embodiments, motorized apparatus 102 is positioned adjacent a portion of an interior surface 108 of storage vessel 100. Interior surface 108 may be any surface within cavity 106 of storage vessel 100. In some embodiments, motorized apparatus 102 detects a characteristic of interior surface 108. For example, in some embodiments, motorized apparatus 102 is used to generate an image of interior surface 108 and the image is examined to determine whether repairs are necessary. If repairs are necessary, motorized apparatus 102 can be used to repair interior surface 108. For example, in some embodiments, motorized apparatus 102 patches a damaged portion of interior surface 108. After inspection and/or repair of interior surface 108, motorized apparatus 102 exits storage vessel 100 through any suitable access port or opening of storage vessel 100.

While inside storage vessel 100, motorized apparatus 102 travels along any surfaces and in any direction through storage vessel 100 to reach a desired location for inspection and/or repair. For example, in some embodiments, motorized apparatus 102 traverses one or more structures 110 within cavity 106. Structures 110 at least partially form inner corners 112 and/or outer corners 114. As used herein, an inner corner refers to a corner on a surface that is less than 180°. In contrast, an outer corner refers to a corner on a surface that is greater than 180°. Motorized apparatus 102 is configured to traverse inner corners 112 and outer corners 114 and maintain contact with surface 108. In particular, motorized apparatus 102 includes wheels 116 and magnets, broadly coupling mechanisms, 118. Magnets 118 provide a magnetic field that attracts magnetic components of storage vessel 100 and enables motorized apparatus 102 to move along surface 108. In some embodiments, surface 108 is a ferromagnetic material and is attracted to magnets 118. As described in detail herein, magnets 118 are positionable relative to surface 108 to adjust the attraction between magnets 118 and surface 108 based on structures 110 traversed by motorized apparatus 102. For example, magnets 118 are positionable to facilitate motorized apparatus 102 transitioning between surfaces 108 forming inner corners 112 and/or outer corners 114.

Motorized apparatus 102 includes a plurality of wheels 116, at least one magnet 118, an articulated body assembly 120, at least one maintenance device 122, and a drive system 115. Articulated body assembly 120 includes a first body 126, a second body 128, and a joint 130 coupled between first body 126 and second body 128. First body 126 and second body 128 define a seam 132 extending along a longitudinal axis 134 of articulated body assembly 120. In alternative embodiments, articulated body assembly 120 includes any bodies 126, 128 that enable motorized apparatus 102 to operate as described herein. For example, in some embodiments, articulated body assembly 120 includes a single body that is at least partially flexible. In further embodiments, articulated body assembly 120 includes three or more bodies and a plurality of joints 130.

In the exemplary embodiment, joint 130 extends through seam 132 and couples first body 126 to second body 128 such that first body 126 is pivotable relative to second body 128 about a pivot axis 133 extending through joint 130. Joint 130 includes any suitable coupling mechanism that allows at least one degree of freedom of first body 126 and/or second body 128. For example, in some embodiments, joint 130 includes at least one bearing assembly 136, 137 coupled to at least one of first body 126 and second body 128. In the exemplary embodiment, joint 130 includes a first bearing assembly 136 coupled to first body 126 and a second bearing assembly 137 coupled to second body 128. A shaft 138 is coupled to and extends along pivot axis 133 between bearing assemblies 136, 137. Accordingly, joint 130 allows passive articulation of body assembly 120 about pivot axis 133. In alternative embodiments, articulated body assembly 120 includes any joint 130 that enables articulated body assembly 120 to operate as described herein. For example, in some embodiments, articulated body assembly 120 includes a plurality of joints 130. In further embodiments, joint 130 is movable along longitudinal axis 134 of articulated body assembly 120 between a first position in which pivot axis 133 of joint 130 is offset from a rotation axis 135 of at least one of wheels 116 and a second position in which pivot axis 133 of joint 130 is aligned with a rotation axis 135 of at least one of wheels 116.

Also, in the exemplary embodiment, wheels 116 are coupled to articulated body assembly 120 and positioned on both sides of seam 132. Specifically, a first set of wheels 116 is coupled to a side of first body 126 opposite seam 132 and a second set of wheels 116 is coupled to a side of second body 128 opposite seam 132. Each wheel 116 is configured to rotate about a rotation axis 135 extending through a center of the respective wheel 116. In addition, each wheel 116 is configured to pivot with the respective body 126, 128 about pivot axis 133. Each rotation axis 135 is substantially parallel to and offset from pivot axis 133. In the exemplary embodiment, motorized apparatus 102 includes four wheels 116. In alternative embodiments, motorized apparatus 102 includes any wheels 116 that enable motorized apparatus 102 to operate as described herein. For example, in some embodiments, motorized apparatus 102 includes two or more wheels.

In addition, in the exemplary embodiment, each wheel 116 is coupled to a shaft 142 extending along rotation axis 135 of the respective wheel 116. A receiver 144 is positioned on each shaft 142 between articulated body assembly 120 and the respective wheel 116. Each receiver 144 extends around shaft 142 and defines an annular groove to receive at least one magnet 118. Receivers 144 are configured to rotate with respective wheels 116. In some embodiments, a compressible member 147 is coupled to each receiver 144 adjacent magnet 118. Compressible member 147 deforms and allows contact between magnet 118 and surface 108. In the exemplary embodiment, receivers 144 each couple to a respective wheel 116 such that magnets 118 rotate with corresponding wheels 116. In alternative embodiments, magnets 118 are coupled to wheels 116 and/or articulated body assembly 120 in any manner that enables motorized apparatus 102 to operate as described herein.

In reference to FIGS. 1 and 2, in the exemplary embodiment, magnets, broadly coupling mechanisms, 118 are configured to adjustably couple motorized apparatus 102 to a surface of storage vessel 100, such as to interior surface 108 of cavity 106. In the exemplary embodiment, magnets 118 magnetically couple to ferromagnetic material of storage vessel 100, such as surface 108. Accordingly, magnets 118 facilitate motorized apparatus 102 remaining coupled to at least a portion of storage vessel 100 during motion. In some embodiments, magnets 118 prevent motorized apparatus 102 from falling or sliding during traverse on highly inclined or even inverted surfaces. In the exemplary embodiment, magnets 118 couple motorized apparatus 102 to storage vessel 100 with a force sufficient to overcome gravitational forces while still allowing for motion using drive system 115. In exemplary embodiments, magnets 118 maintain articulated body assembly 120 on interior surface 108 of storage vessel 100 with a force in a range from approximately 0.1 N to approximately 100 N. In alternative embodiments, motorized apparatus 102 includes any coupling mechanism that enables motorized apparatus 102 to operate as described herein. For example, in some embodiments, motorized apparatus 102 includes, without limitation, fans, thrusters, electrostatic adhesion, suction devices, and/or vacuum adhesion devices.

Moreover, in the exemplary embodiment, each magnet 118 has oppositely charged ends (i.e., north and south poles) and an axis of polarity extending through the two ends. Each magnet 118 is coupled to wheel 116 such that magnet 118 extends along rotation axis 135 of the respective wheel 116 and the axis of polarity is aligned with rotation axis 135. In the exemplary embodiment, each magnet 118 is a cylinder. Accordingly, the magnetic fields of magnets 118 are oriented outward from rotation axis 135 and are configured to encompass surface 108 as wheels 116 move along surface 108. In alternative embodiments, motorized apparatus 102 includes any magnet(s) 118 that enables motorized apparatus 102 to operate as described herein.

Also, in the exemplary embodiment, a drive system 115 is coupled to articulated body assembly 120, which forms a chassis of motorized apparatus 102. Drive system 115 is configured to move articulated body assembly 120 relative to storage vessel 100. Drive system 115 includes a drive mechanism, such as wheels 116, and one or more motors 117 drivingly coupled to the drive mechanism. A power source, such as a battery, provides power for operation of motor 117. During operation, motor 117 induces rotation of wheels 116 relative to articulated body assembly 120. Motorized apparatus 102 moves along surface 108 as wheels 116 rotate in contact with surface 108. In the exemplary embodiment, drive system 115 is a differential drive system and is capable of rotating each wheel 116 at a speed different from the rotational speed of other wheels 116. In alternative embodiments, motorized apparatus 102 includes any drive system 115 that enables motorized apparatus 102 to operate as described. For example, in some embodiments, drive system 115 includes a drive mechanism other than wheels 116, such as treads, tracks, worms, legs, and/or electromagnetic or fluidic locomotion mechanisms.

In addition, in the exemplary embodiment, maintenance device 122 is coupled to articulated body assembly 120. In particular, in the exemplary embodiment, maintenance device 122 includes a sensor. In some embodiments, maintenance device 122 is movable relative to articulated body assembly 120. In alternative embodiments, motorized apparatus 102 includes any maintenance device 122 that enables motorized apparatus 102 to operate as described herein. For example, in some embodiments, maintenance device 122 includes, without limitation, any of the following: an applicator, a drill, a grinder, a heater, a visual sensor, a mechanical sensor, a temperature sensor, a magnetic sensor, an infrared sensor, an acoustic sensor, and an eddy current sensor. In some embodiments, maintenance device 122 is used to provide information for steering motorized apparatus 102 and/or to perform a maintenance operation.

Moreover, in the exemplary embodiment, drive system 115 includes a steering component 140 configured to steer motorized apparatus 102 as motorized apparatus 102 moves. In particular, steering component 140 directs motorized apparatus 102 as wheels 116 propel motorized apparatus 102. In the exemplary embodiment, steering component 140 includes a controller (not shown) that differentially drives motors 117 that drive wheels 116 to translate motorized apparatus 102 forward and backward and steer motorized apparatus 102. In some embodiments, steering component 140 includes a controller (not shown) that controls a motor to move an articulated steering mechanism and turn drive wheels such that motorized apparatus 102 is steered as it translates forward or backward. In some embodiments, steering component 140 steers motorized apparatus 102 based at least in part on information received via a communication component 145. In further embodiments, motorized apparatus 102 is at least partially automated and steering component 140 steers motorized apparatus 102 based at least in part on information from any components of motorized apparatus 102, such as maintenance device 122. In alternative embodiments, motorized apparatus 102 includes any steering component 140 that enables motorized apparatus 102 to operate as described herein.

In the exemplary embodiment, system 101 includes a controller 160 that includes a transceiver 164, a processor 166, and a memory 168. Transceiver 164 is communicatively coupled with motorized apparatus 102 and is configured to send information to and receive information from a communication component 145 of motorized apparatus 102. In the exemplary embodiment, transceiver 164 and communication component 145 communicate wirelessly. In alternative embodiments, motorized apparatus 102 and controller 160 communicate in any manner that enables motorized apparatus 102 to operate as described herein. For example, in some embodiments, controller 160 and motorized apparatus 102 exchange information through a wired link extending between motorized apparatus 102 and controller 160.

In some embodiments, maintenance device 122 is configured to detect a characteristic of storage vessel 100 (shown in FIG. 1) and generate data relating to the characteristic. For example, in some embodiments, maintenance device 122 includes one or more sensors which detect distance and depth of surface 108 and/or structures 110 proximate motorized apparatus 102. In some embodiments, sensors detect when motorized apparatus 102 is approaching a downward slope and/or recess of surface 108. In further embodiments, maintenance device 122 includes time of flight sensors, visual sensors, and/or any other suitable sensors. Transceiver 164 is configured to receive information relating to the characteristic detected by maintenance device 122.

In addition, in the exemplary embodiment, motorized apparatus 102 includes a processor 170 and a memory 172. Processor 170 is configured to execute instructions for controlling maintenance device 122, magnets 118, steering component 140, and/or drive system 115 of motorized apparatus 102. In alternative embodiments, motorized apparatus 102 includes any processor 170 that enables motorized apparatus 102 to operate as described herein. In some embodiments, processor 170 and/or memory 172 is omitted.

Also, in the exemplary embodiment, system 101 includes a user interface 162 that is configured to display information relating to the characteristics detected by maintenance device 122 for interpretation by the user. For example, in some embodiments, user interface 162 displays images of interior surface 108 of storage vessel 100. User interface 162 may be included on a remote computing device (not shown) and/or may be incorporated with controller 160. User interface 162 may include, among other possibilities, a web browser and/or a client application. In some embodiments, user interface 162 allows a user to input and/or view information relating to control of motorized apparatus 102. In the exemplary embodiment, user interface 162 is configured to display information relating to the state of one or more of maintenance device 122, drive system 115, a power source, magnets 118, and steering component 140 for interpretation by the user. For example, state information may include the position of one or more of maintenance device 122 and magnets 118 relative to articulated body assembly 120 of motorized apparatus 102. Processor 166 translates user inputs into steering, tool motion, camera control, sensor control, sensor motion, and/or any other commands and sends information via transceiver 164 to motorized apparatus 102 via communication component 145. In some embodiments, user control of motorized apparatus 102 is in real time, such as through a joystick, keyboard, touchscreen or other interface having similar function. In other embodiments, motorized apparatus 102 is controlled partially or wholly according to a pre-programmed routine. In some embodiments, a user inputs information, such as operation goals or conditional directions, and motorized apparatus 102 is at least partially automated. In further embodiments, information, such as information received by controller 160 from motorized apparatus 102, control data sent to motorized apparatus 102, and additional user inputs or state information (e.g., location, time, orientation, datalink quality, battery levels, repair material levels, failure mode indicators) is logged into memory 172 and/or memory 168.

Moreover, in the exemplary embodiment, controller 160 is positioned on the exterior of storage vessel 100 and communicates with motorized apparatus 102 positioned within storage vessel 100. For example, controller 160 is configured to send information to motorized apparatus 102 relating to the propulsion and/or steering of motorized apparatus 102 while motorized apparatus 102 is moving within cavity 106 of storage vessel 100. In alternative embodiments, controller 160 and motorized apparatus 102 are configured in any manner that enables system 101 to operate as described herein.

In addition, in some embodiments, motorized apparatus 102 is steered based at least in part on information received from maintenance device 122 and/or separate sensors (not shown) within cavity 106. For example, maintenance device 122 and/or the sensors detect structures 110 within cavity 106 and steering of motorized apparatus 102 is adjusted based on the detected structures 110. In some embodiments, information relating to structures 110 is displayed on user interface 162. In further embodiments, the steering of motorized apparatus 102 is adjusted at least in part automatically by controller 160 based on information detected by the sensors. For example, in some embodiments, the steering is adjusted by controller 160 such that motorized apparatus 102 has a desired an angle of approach relative to structure 110. In some embodiments, the angle of approach is determined based on characteristics of corners 112, 114 and/or structure 110. In further embodiments, the steering is adjusted based at least partially on user inputs. In some embodiments, controller 160 is configured to assist user control of motorized apparatus 102 based on detected structures 110. For example, in some embodiments, controller 160 limits and/or automatically adjusts the speed of motorized apparatus 102 when motorized apparatus 102 is approaching and/or traversing structure 110. In alternative embodiments, motorized apparatus 102 is steered in any manner that enables motorized apparatus 102 to operate as described herein.

Figure 3:
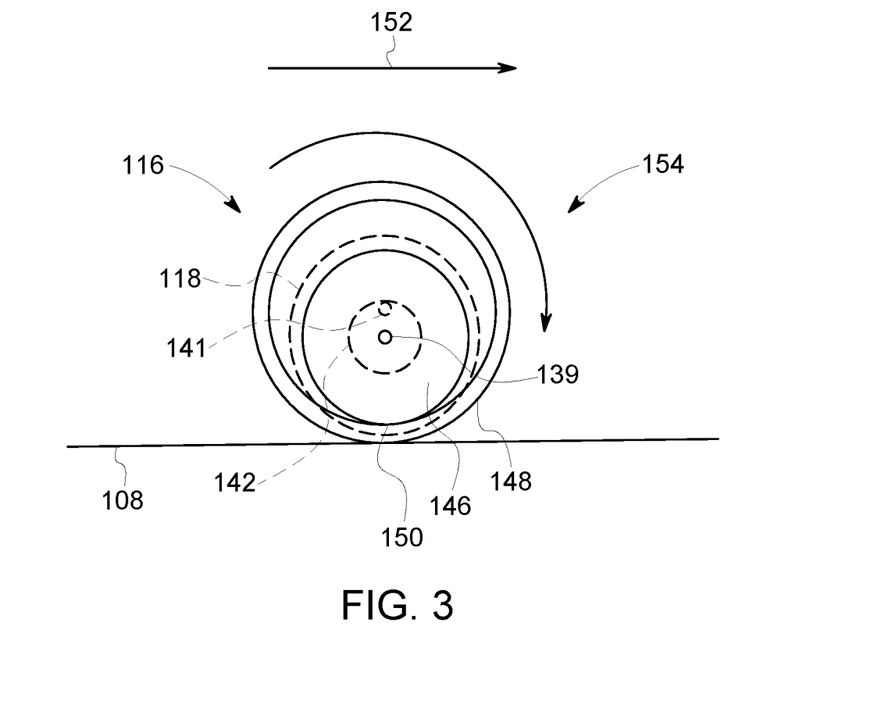
FIG. 3 is a schematic view of a wheel of the motorized apparatus shown in FIG. 1 in a first position.
Figure 4:
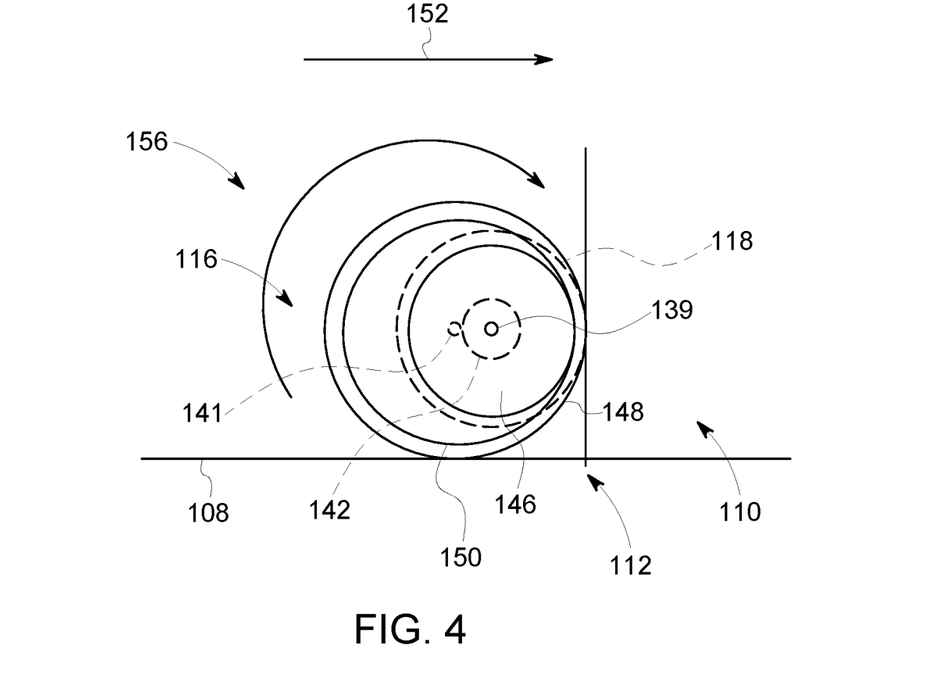
FIG. 4 is a schematic view of a wheel of the motorized apparatus shown in FIG. 1 in a second position.
Figure 5:
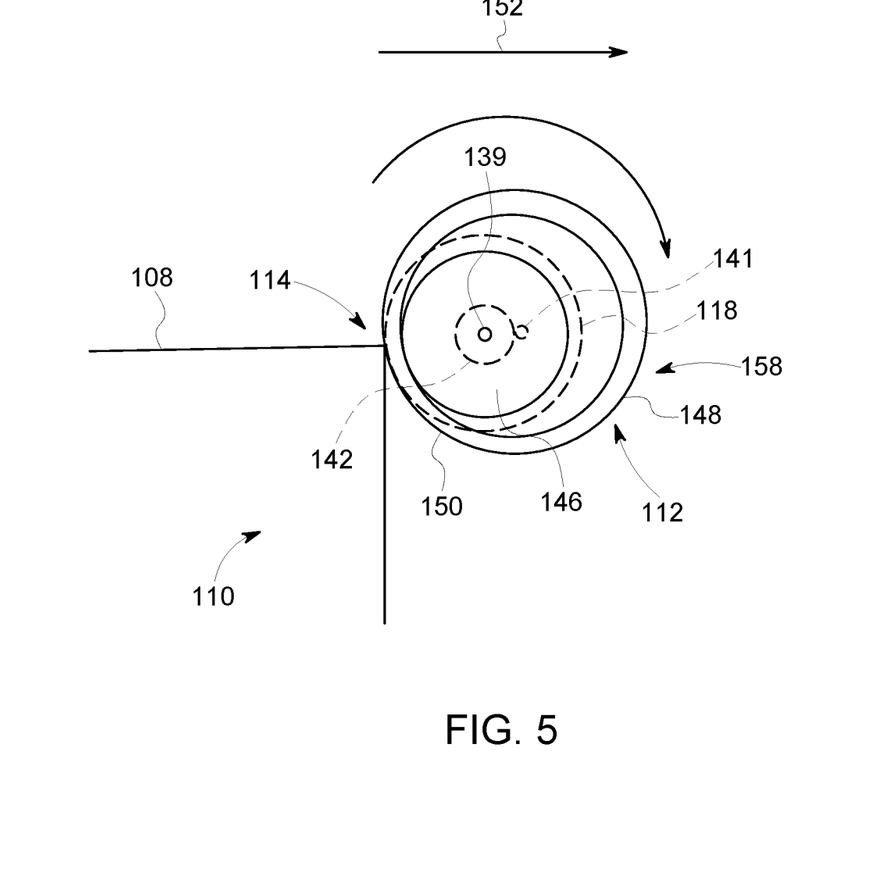
FIG. 5 is a schematic view of a wheel of the motorized apparatus shown in FIG. 1 in a third position.

FIG. 3 is a schematic view of wheel 116 of motorized apparatus 102 (shown in FIG. 1) in a first position 154. FIG. 4 is a schematic view of wheel 116 of motorized apparatus 102 (shown in FIG. 1) in a second position 156. FIG. 5 is a schematic view of wheel 116 of motorized apparatus 102 (shown in FIG. 1) in a third position 158. Also, in the exemplary embodiment, each wheel 116 includes an inner member 146 and an outer member 148. Inner member 146 and outer member 148 are positionable relative to each other. Specifically, outer member 148 is coupled to inner member 146 such that outer member 148 is movable relative to inner member 146. Moreover, in the exemplary embodiment, inner member 146 and outer member 148 are discs and inner member 146 has a diameter that is smaller than a diameter of outer member 148. Inner member 146 has a center 139 and outer member 148 has a center 141 offset from center 139. Rotation axis 135 extends through center 139 of inner member 146, and center 141 of outer member 148 is offset from rotation axis 135. Accordingly, inner member 146 travels along the interior of an outer rim 150 of outer member 148 as wheels 116 rotate to move motorized apparatus 102 along surface 108. In alternative embodiments, wheels 116 have any configuration that enables motorized apparatus 102 to operate as described herein. For example, in some embodiments, motorized apparatus 102 includes one or more mecanum wheels including a plurality of electronically controlled components. In some embodiments, outer member 148 is coupled to the electronically controlled components of the mecanum wheels.

Also, in the exemplary embodiment, each wheel 116 is transitionable between a plurality of positions relative to a travel direction 152 of motorized apparatus 102 (shown in FIG. 1) along surface 108. In each position, inner member 146 and outer member 148 have different locations relative to each other. For example, in first position 154 shown in FIG. 3, inner member 146 and outer member are positioned such that center 139 of inner member 146 is located below and aligned with center 141 of outer member 148. In second position 156 shown in FIG. 4, inner member 146 and outer member 148 are positioned such that center 139 of inner member 146 is forward of center 141 of outer member 148 relative to travel direction 152. In third position 158 shown in FIG. 5, inner member 146 and outer member 148 are positioned such that center 139 of inner member 146 is rearward of center 141 of outer member 148 relative to travel direction 152. As a result, magnet 118, which is coupled to and moves with inner member 146, is located a different distance from surface 108 in each position of wheel 116. In alternative embodiments, wheels 116 have any positions that enable motorized apparatus 102 to operate as described herein.

In addition, in the exemplary embodiment, portions of surface 108 contact wheels 116 and cause wheels 116 to move between positions 154, 156, 158 when motorized apparatus 102 is traveling along surface 108. For example, wheels 116 remain in first position 154 when motorized apparatus 102 is traveling along a relatively planar surface 109. When wheels 116 traverse structures 110, outer member 148 is displaced relative to inner member 146 and wheels 116 move to second position 156 and/or third position 158. For example, as wheel 116 traverses inner corner 112, outer member 148 contacts angled surface 111 of structure 110 forming inner corner 112. Inner member 146 travels upward and forward relative to outer member 148 and wheel 116 moves between first position 154 and second position 156. As a result, magnet 118 is moved away from planar surface 109 and toward angled surface 111 of structure 110 and the position of wheel 116 inhibits wheel 116 becoming trapped in inner corner 112. As wheel 116 traverses outer corner 114, inner member 146 travels upward and rearward relative to outer member 148 and wheel 116 moves between first position 154 and third position 158. As a result, magnet 118 is moved away from planar surface 109 and toward angled surface 111 of structure 110 and the position of wheel 116 facilitates wheel 116 remaining magnetically coupled to surface 108.

In reference to FIGS. 1-5, a method for operating motorized apparatus 102 within cavity 106 of storage vessel 100 includes positioning motorized apparatus 102 within cavity 106 and rotating wheels 116 to drive motorized apparatus 102 along surface 108. In some embodiments, surface 108 is not necessarily within cavity 106 and may be an exterior surface of storage vessel 100. As motorized apparatus 102 moves along surface 108, maintenance device 122 is used to detect structures 110 along surface 108. In some embodiments, corners 112, 114 are identified along surface 108. Steering of motorized apparatus 102 is adjusted based on detected structures 110. For example, in some embodiments, an angle of approach relative to structure 110 is determined and motorized apparatus 102 is steered to provide the angle of approach of motorized apparatus 102 relative to structure 110. The angle of approach may be provided by positioning a first wheel 116 forward of a second wheel 116 which has a common rotation axis 135 with first wheel 116. In further embodiments, a speed of motorized apparatus 102 is adjusted, e.g., motorized apparatus is speed up, slowed down, and/or a maximum speed is established, as motorized apparatus 102 approaches structure 110. In alternative embodiments, motorized apparatus 102 is steered in any manner that enables motorized apparatus 102 to operate as described herein.

Also, in the exemplary embodiment, the method includes positioning wheels 116 between first position 154, second position 156, and/or third position 158 as motorized apparatus 102 traverses structure 110. Specifically, outer member 148 is moved in a radial direction relative to inner member 146 to move each wheel 116 between first position 154, second position 156, and/or third position 158. As a result, magnets 118 move relative to surface 108 into a position where magnets 118 maintain motorized apparatus 102 on surface 108 with a desired force.

Figure 6:
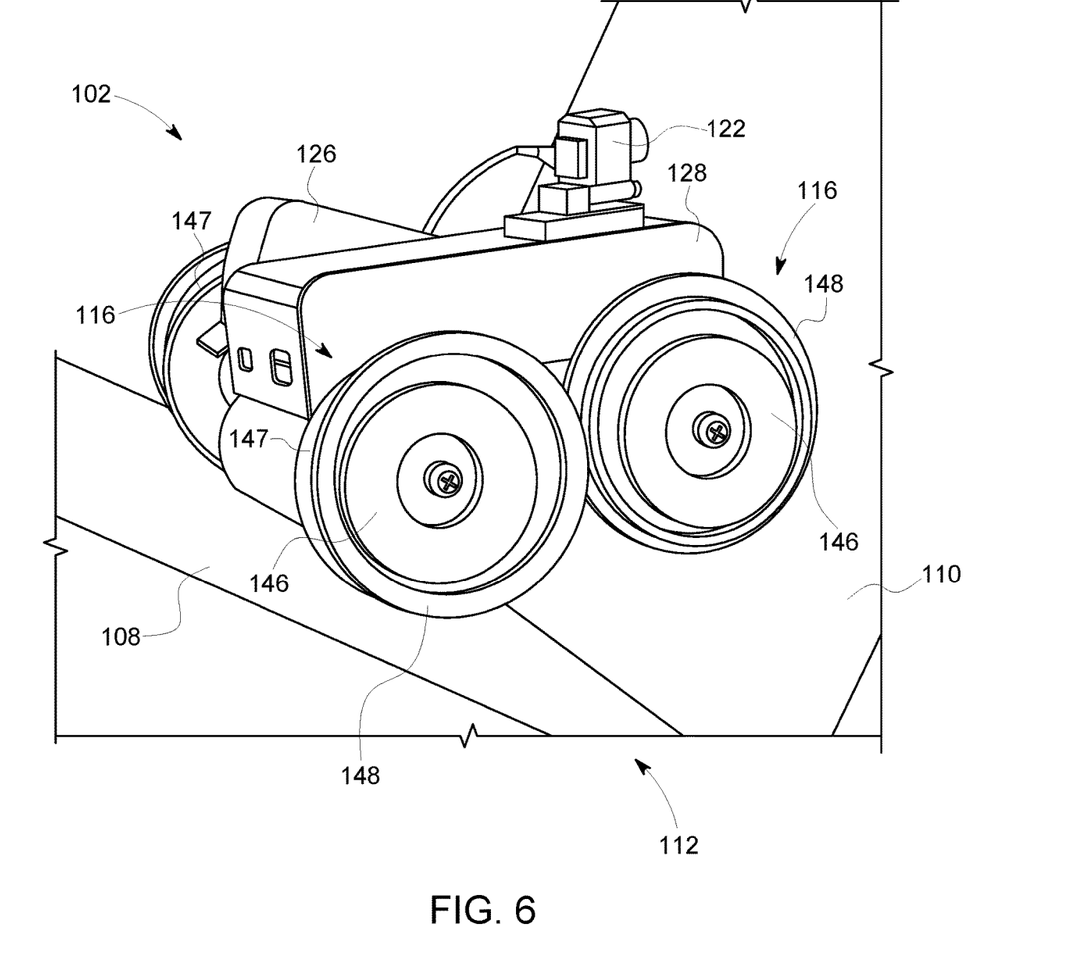
FIG. 6 is a perspective view of the motorized apparatus shown in FIG. 1 traversing a structure forming an inner corner.
Figure 7:
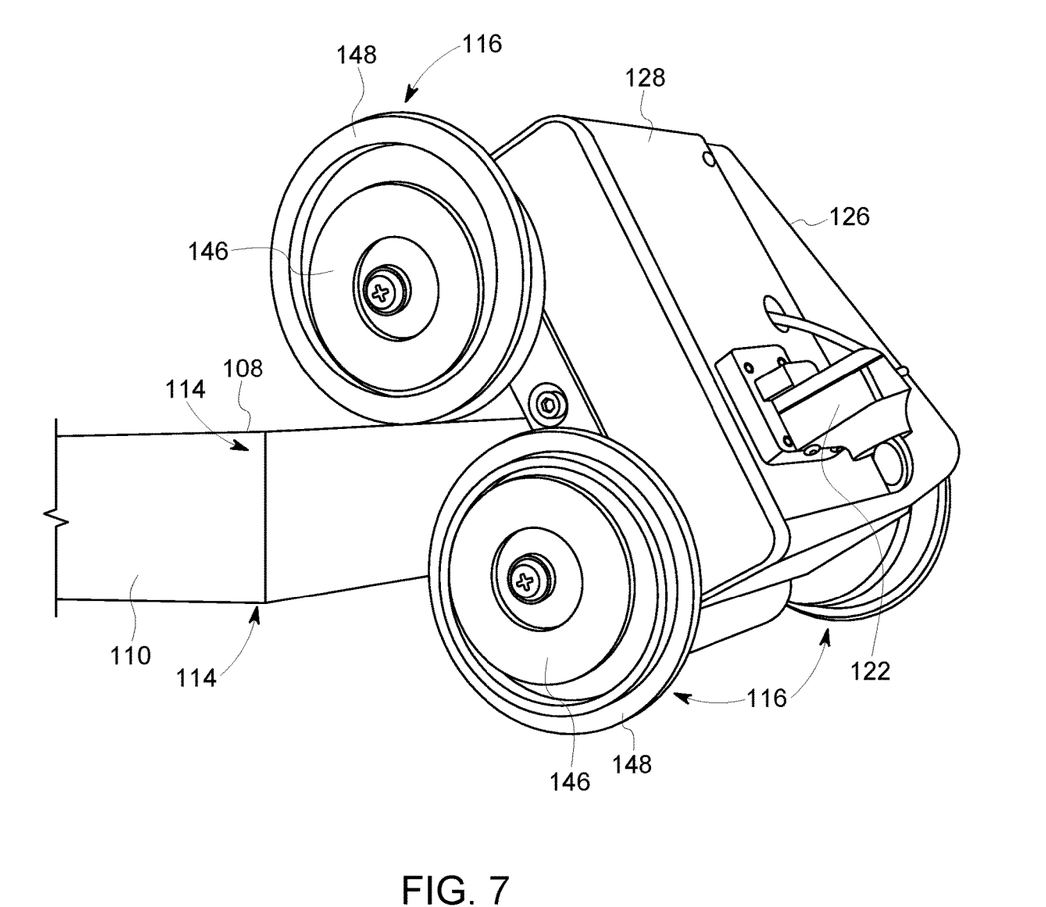
FIG. 7 is a perspective view of the motorized apparatus shown in FIG. 1 traversing a structure forming an outer corner.

FIG. 6 is a perspective view of motorized apparatus 102 traversing a structure 110 forming inner corner 112. FIG. 7 is a perspective view of motorized apparatus 102 traversing a structure 110 forming outer corner 114. Wheels 116 are in different positions as motorized apparatus 102 traverses inner corner 112 and/or outer corner 114. Specifically, angled portions of surface 108 displace outer member 148 to move wheel 116 between the different positions. In some embodiments, motorized apparatus 102 is steered to adjust its path based on detected structures 110. For example, in some embodiments, motorized apparatus 102 is steered such that one wheel 116 is positioned forward of another wheel 116 having the same rotation axis 135. Accordingly, the forward wheel 116 is configured to approach the structure 110 before the other wheel 116 and motorized apparatus 102 has an angle of approach, i.e., an angled path relative to a front edge of the structure, that facilitates motorized apparatus 102 traversing structure 110. In some embodiments, steering component 140 (shown in FIG. 2) at least partially turns motorized apparatus 102 to provide the desired angle of approach. In the exemplary embodiment, steering component 140 adjusts the differential speed of wheels 116 to cause motorized apparatus 102 to have the desired angle of approach. In alternative embodiments, motorized apparatus 102 is steered in any manner that enables motorized apparatus 102 to operate as described herein.

Also, in the exemplary embodiment, joint 130 allows first body 126 to pivot relative to second body 128 as motorized apparatus 102 traverses structures 110. In particular, first body 126 and second body 128 are able to pivot relative to each other to accommodate the different positions of wheels 116. As a result, the angle of approach and the articulation of articulated body assembly 120 facilitate motorized apparatus 102 traversing structures 110 and maintaining adhesion to surface 108.

Figure 8:
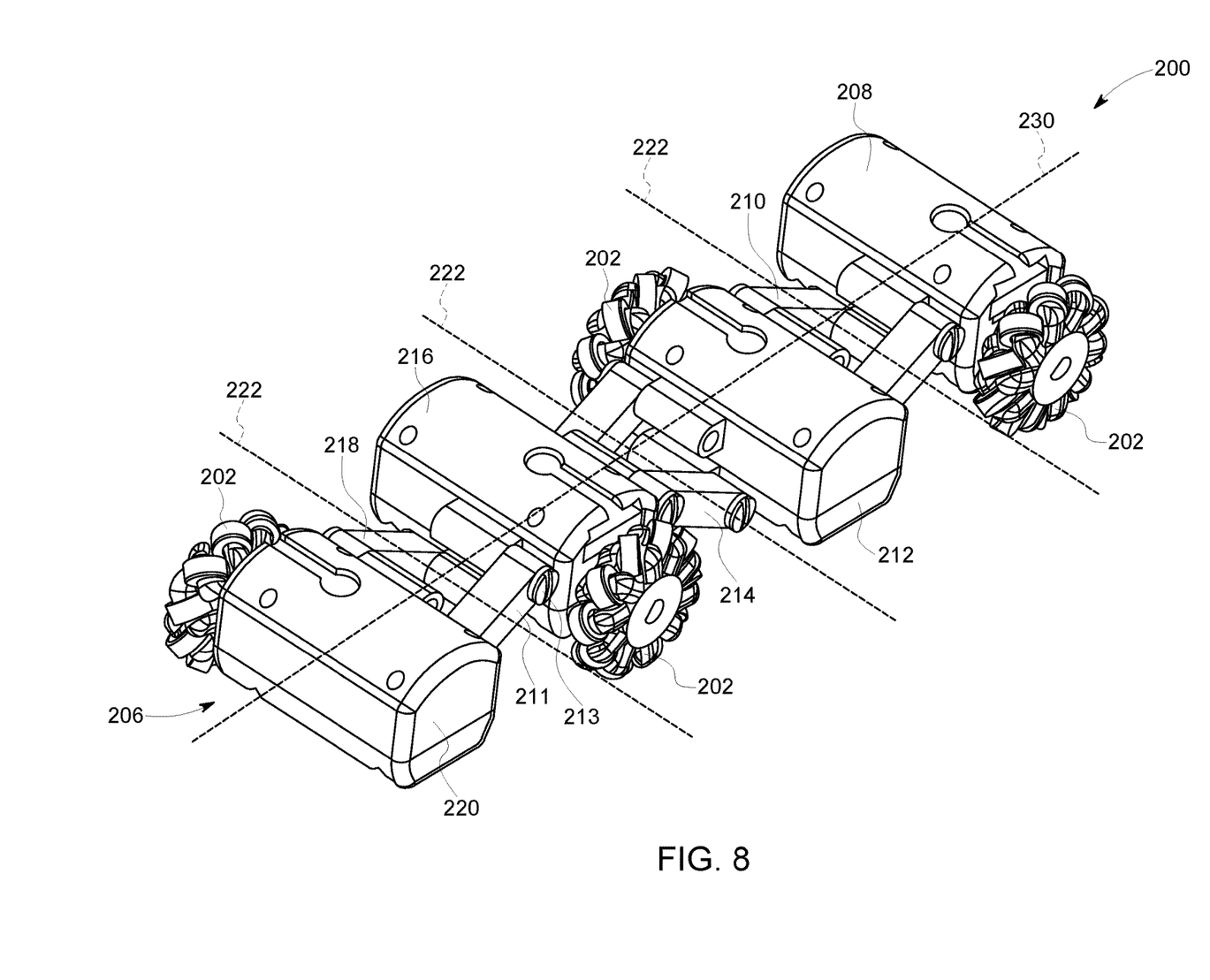
FIG. 8 is a perspective view of an exemplary motorized apparatus.

FIG. 8 is a perspective view of an exemplary motorized apparatus 200. Motorized apparatus 200 includes a plurality of wheels 202, an articulated body assembly 206, and a drive system (not shown). Articulated body assembly 206 includes a first body 208, a first joint 210, a second body 212, a second joint 214, a third body 216, a third joint 218, and a fourth body 220. First joint 210 is coupled between first body 208 and second body 212. Second joint 214 is coupled between second body 212 and third body 216. Third joint 218 is coupled between third body 216 and fourth body 220. In alternative embodiments, articulated body assembly 206 includes any bodies 208, 212, 216, 220 and/or joints 210, 214, 218 that enable motorized apparatus 200 to operate as described herein. For example, in some embodiments, articulated body assembly 206 includes at least four segments and each segment includes one body 208, 212, 216, 220 or joint 210, 214, 218.

Also, in the exemplary embodiment, at least one wheel 202 is coupled to each body 208, 212, 216, 220 of articulated body assembly 206. Wheels 202 are mecanum wheels and include a plurality of passively controlled components. Wheels 202 are transitionable between a plurality of positions. Accordingly, wheels 202 allow motorized apparatus 200 to move in a plurality of different directions and provide increased control of movement of motorized apparatus 200. For example, motorized apparatus 200 is able to move in directions parallel to axes 222, perpendicular to axis 230, parallel to axis 230, and perpendicular to axis 230. In addition, motorized apparatus 200 is able to rotate around an axis perpendicular to axes 222 and axis 230. In alternative embodiments, motorized apparatus 200 includes any wheels 202 that enable motorized apparatus 200 to operate as described herein.

In the exemplary embodiment, joints 210, 214, 218 allow each body 208, 212, 216, 220 to pivot relative to adjacent bodies 208, 212, 216, 220 about at least one pivot axis 222 extending through each joint 210, 214, 218. Each joint 210, 214, 218 includes a plurality, specifically a pair, of arms 211. Opposite ends of each arm 211 are coupled to respective adjacent bodies 208, 212, 216, 220 by hinges 213. In the exemplary embodiment, joints 210, 214, 218 are configured such that pivot axes 222 extend substantially perpendicular to a longitudinal axis 230 of articulated body assembly 206. In alternative embodiments, articulated body assembly 206 includes any joints 210, 214, 218 that enable motorized apparatus 200 to operate as described herein. For example, in some embodiments, joints 210, 214, 218 enable bodies 208, 212, 216, 220 to have two or more degrees of freedom. In further embodiments, joints 210, 214, 218 allow bodies 208, 212, 216, 220 to pivot about axes oblique to longitudinal axis 230.

Figure 9:
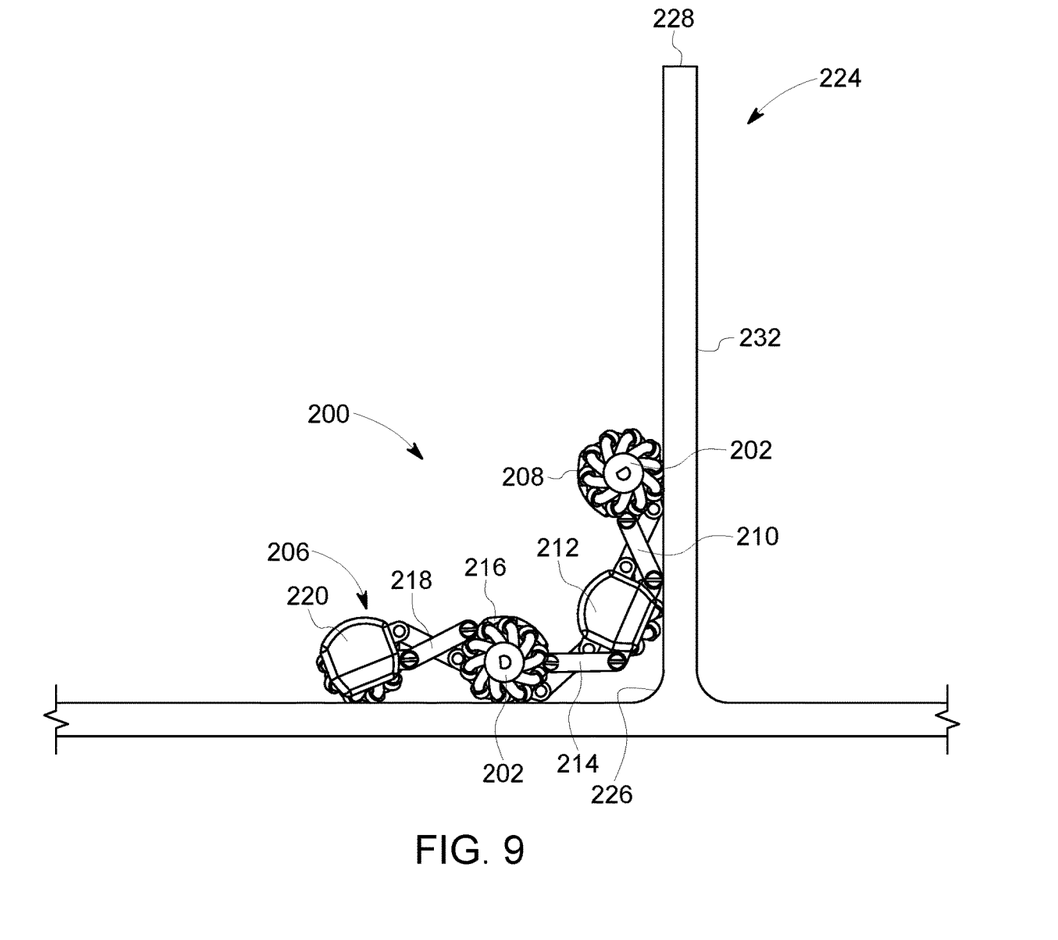
FIG. 9 is a side view of the motorized apparatus shown in FIG. 8 traversing a structure forming an inner corner.
Figure 10:
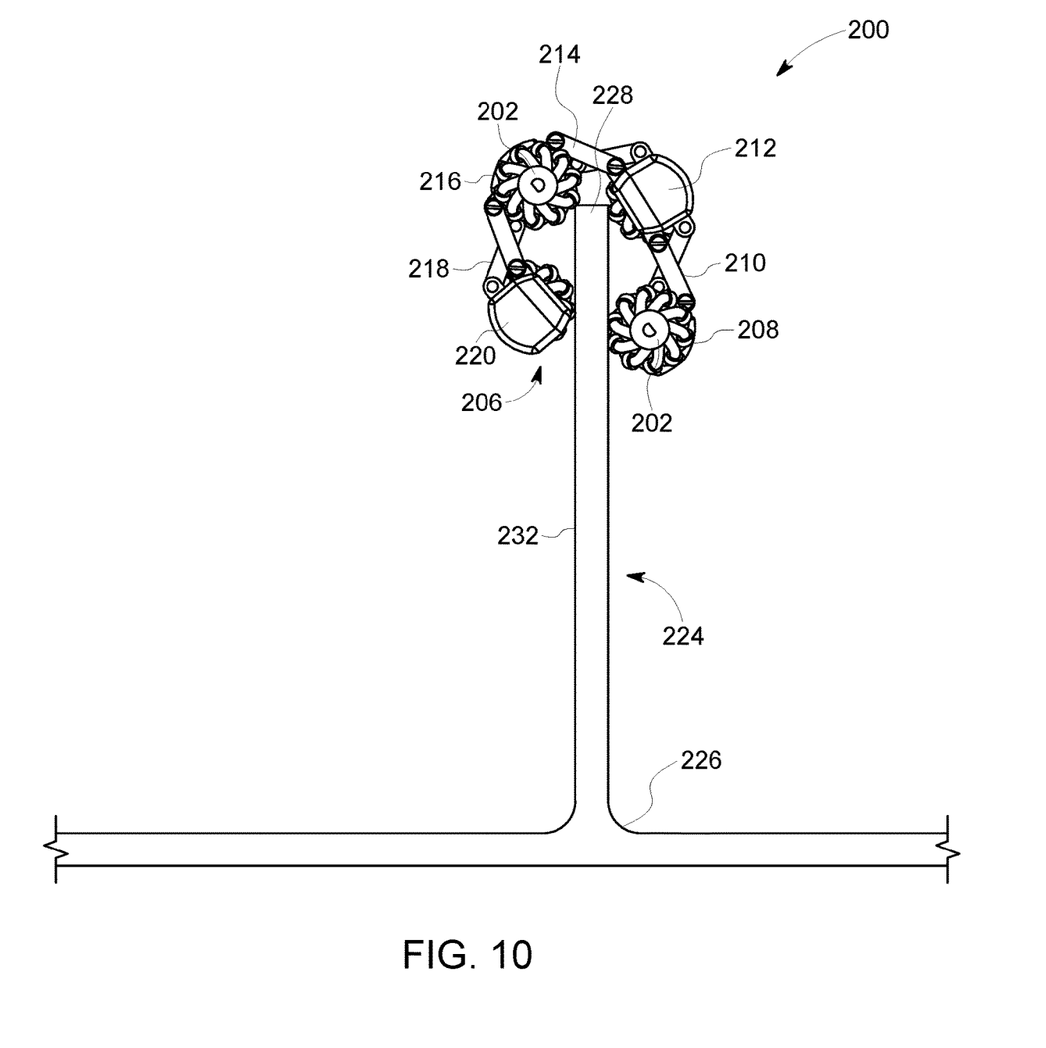
FIG. 10 is a side view of the motorized apparatus shown in FIG. 8 traversing a structure forming an outer corner.

FIG. 9 is a side view of motorized apparatus 200 traversing a structure 224 forming an inner corner 226. FIG. 10 is a side view of motorized apparatus 200 traversing structure 224 forming an outer corner 228. Articulated body assembly 206 articulates as motorized apparatus 200 traverses structure 224. For example, each body 208, 212, 216, 220 is allowed to pivot relative to an adjacent body 208, 212, 216, 220 because of joints 210, 214, 218. As a result, wheels 202 maintain contact with a surface 232 of structure 224 as motorized apparatus 200 traverses structure 224.

The above described embodiments provide motorized apparatus for use in maintaining machines. The motorized apparatus is configured to move along a surface and/or through a cavity of a machine. The motorized apparatus is self-propelled and includes an articulated body assembly. For example, the motorized apparatus includes a first body, a second body, and a joint extending through a seam between the first body and the second body. The joint allows the first body to pivot relative to the second body about a pivot axis through the joint. As a result, the motorized apparatus provides increased access to difficult-to-reach locations and reduces the amount of time the machine is out of service for maintenance.

An exemplary technical effect of the methods, systems, and apparatus described herein includes at least one of: (a) reducing the time to inspect and/or repair machines; (b) increasing the accessibility of difficult-to-reach locations within a machine for inspection and/or in situ repair; (c) reducing the time that machines are out of service for maintenance; and (d) increasing the precision and reliability of inspection and/or repair of machines.

Exemplary embodiments of methods, systems, and apparatus for maintaining rotary machines are not limited to the specific embodiments described herein, but rather, components of systems and/or steps of the methods may be utilized independently and separately from other components and/or steps described herein. For example, the methods, systems, and apparatus may also be used in combination with other systems requiring inspection and/or repair of components, and are not limited to practice with only the systems and methods as described herein. Rather, the exemplary embodiment can be implemented and utilized in connection with many other applications, equipment, and systems that may benefit from using a motorized apparatus for inspection and/or repair.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motorized apparatus, comprising:
    an articulated body assembly, comprising:
        a first body;
        a second body; and
        a joint coupling the first body to the second body, wherein the first body is pivotable relative to the second body about a pivot axis of the joint;
    a plurality of wheels coupled to the first body, wherein one or more wheels of the plurality of wheels each comprise:
        an outer member having a wheel surface and an outer rim protruding from the wheel surface;
        an inner member configured to rotate about a central axis of the inner member and travel along the outer rim relative to the outer member, wherein the wheel surface is positioned between the first body and the inner member along the central axis; and
        a magnet disposed about the inner member and around the central axis; and
    a motor configured to drive rotation of the one or more wheels to move the articulated body assembly relative to a surface.

2. The motorized apparatus in accordance with claim 1, wherein the outer member is moveable relative to the inner member to transition a corresponding wheel of the one or more wheels between a first position and a second position.

3. The motorized apparatus in accordance with claim 2, wherein the motor is configured to drive rotation of the inner member about the central axis of the inner member, and wherein the outer member has a center that is offset from the central axis.

4. The motorized apparatus in accordance with claim 2, wherein the motorized apparatus comprises a steering component configured to steer the motorized apparatus along a path in a travel direction and to position at least one wheel of the plurality of wheels in front of other wheels of the plurality of wheels relative to the travel direction.

5. The motorized apparatus in accordance with claim 1, wherein the magnet is a cylinder and defines an axis of polarity, and wherein the axis of polarity extends along the central axis of the inner member of a corresponding wheel of the one or more wheels.

6. The motorized apparatus in accordance with claim 5, wherein the corresponding wheel includes a receiver configured to receive the magnet.

7. The motorized apparatus in accordance with claim 6, wherein the corresponding wheel comprises a compressible member coupled to the receiver adjacent to the magnet.

8. The motorized apparatus in accordance with claim 1, wherein the joint includes at least one bearing assembly coupled to the articulated body assembly, wherein the at least one bearing assembly is configured to allow passive articulation of the articulated body assembly about the pivot axis.

9. The motorized apparatus in accordance with claim 8, wherein the pivot axis is substantially parallel to the central axis of the inner member of a corresponding wheel of the one or more wheels.

10. The motorized apparatus in accordance with claim 1, wherein the first body and the second body define a seam extending along a longitudinal axis of the articulated body assembly, and wherein the plurality of wheels comprises a first set of wheels coupled to a first side of the first body spaced apart from and parallel to the seam and a second set of wheels coupled to a second side of the second body opposite the first side.

11. The motorized apparatus in accordance with claim 1, wherein the joint is moveable along a longitudinal axis of the articulated body assembly such that the pivot axis of the joint is alignable with a rotational axis of the wheel.

12. A system for maintaining a machine, the system comprising:
    a motorized apparatus configured to move along a path, the motorized apparatus comprising:
        an articulated body assembly including at least one joint, wherein the at least one joint is configured to allow articulation of the articulated body assembly about at least one axis;
        a plurality of wheels coupled to the articulated body assembly, wherein one or more wheels of the plurality of wheels each comprise:

an outer member having a wheel surface and an outer rim protruding from the wheel surface;

an inner member configured to rotate about a central axis of the inner member and travel along the outer rim relative to the outer member, wherein the wheel surface is positioned between the articulated body assembly and the inner member along the central axis; and a magnet disposed about the inner member and around the central axis;

a drive system configured to move the articulated body assembly relative to a surface, the drive system comprising a steering component configured to steer the motorized apparatus along the path;

at least one sensor coupled to the motorized apparatus and configured to provide feedback indicative of one or more structures along the path; and a controller configured to receive the feedback and instruct the drive system to adjust an angle of approach of the motorized apparatus based on the feedback.

13. The system in accordance with claim 12, wherein the one or more wheels comprise a first wheel and a second wheel of the plurality of wheels, wherein the first wheel is coupled to the articulated body assembly on a first side of the articulated body assembly and the second wheel is coupled to the articulated body assembly on a second side of the articulated body assembly, wherein the first wheel and the second wheel are configured to rotate about a common rotation axis, and wherein the steering component is configured to steer the motorized apparatus such that the first wheel is positioned forward of the second wheel relative to a travel direction of the motorized apparatus.

14. The system in accordance with claim 13, wherein the steering component comprises a differential drive system configured to rotate the plurality of wheels at different speeds.

15. The system in accordance with claim 12, wherein the controller is configured to adjust a speed of the motorized apparatus based on the feedback provided by the at least one sensor.

16. A method for operating a motorized apparatus, the method comprising:

positioning the motorized apparatus on a surface of a machine, the motorized apparatus including an articulated body assembly and a plurality of wheels coupled to the articulated body assembly, the articulated body assembly including at least one joint configured to allow articulation of the articulated body assembly about an axis;

rotating the plurality of wheels to drive the motorized apparatus along the surface of the machine, wherein one or more wheels of the plurality of wheels each comprise:

an outer member having a wheel surface and an outer rim protruding from the wheel surface;

an inner member configured to rotate about a central axis of the inner member and travel along the outer rim relative to the outer member, wherein the wheel surface is positioned between the articulated body assembly and the inner member along the central axis; and a magnet disposed about the inner member and around the central axis;

generating, using at least one sensor, feedback indicative of a structure along the surface;

steering, based on the feedback, the motorized apparatus to achieve an angle of approach of the motorized apparatus relative to the structure.

17. The method in accordance with claim 16, wherein the one or more wheels comprise a first wheel and a second wheel of the plurality of wheels, wherein the first wheel is coupled to a first side of the articulated body assembly and the second wheel is coupled to a second side of the articulated body assembly, wherein the first wheel and the second wheel are configured to rotate about a common rotation axis, and wherein the method further comprises steering the motorized apparatus such that the first wheel is positioned forward of the second wheel.

18. The method in accordance with claim 17, wherein steering the motorized apparatus such that the first wheel is positioned forward of the second wheel comprises rotating the first wheel at a greater speed than the second wheel.

19. The method in accordance with claim 16, further comprising moving the outer member of a corresponding wheel of the one or more wheels in a radial direction relative to the inner member to transition the corresponding wheel between a first position and a second position.

20. The method in accordance with claim 16, further comprising identifying a corner and determining the angle of approach based on identification of the corner.

* * * * *